United States Patent [19]

Matta et al.

[11] 4,244,440

[45] Jan. 13, 1981

[54] APPARATUS FOR SUPPRESSING INTERNALLY GENERATED GAS TURBINE ENGINE LOW FREQUENCY NOISE

[75] Inventors: Ram K. Matta, Loveland; William S. Clapper, West Chester, both of Ohio

[73] Assignee: General Electric Company, Cincinnati, Ohio

[21] Appl. No.: 965,652

[22] Filed: Dec. 1, 1978

[51] Int. Cl.³ .................... F02K 1/00

[52] U.S. Cl. .................... 181/213; 181/239; 181/247

[58] Field of Search .............. 181/212, 215, 216, 219, 181/222, 220, 238, 239, 243, 247-252, 258, 264, 268, 275, 279-281, 213; 138/37, 39, 44; 239/127.1, 265.17, 265.19; 60/262

[56] References Cited

U.S. PATENT DOCUMENTS

| | | | |
|---|---|---|---|
| 2,915,136 | 12/1959 | Ringles | 181/213 |
| 2,987,883 | 6/1961 | Lawler | 181/215 |
| 3,495,682 | 2/1970 | Treiber | 181/220 |
| 3,630,311 | 12/1971 | Nagamatsu | 181/213 |
| 3,708,036 | 1/1973 | Duthion et al. | 181/213 |
| 3,954,224 | 5/1976 | Colebrook et al. | 181/213 |
| 4,064,961 | 12/1977 | Tseo | 181/213 |
| 4,135,363 | 1/1979 | Packman | 181/213 |

*Primary Examiner*—L. T. Hix
*Assistant Examiner*—Benjamin R. Fuller
*Attorney, Agent, or Firm*—Patrick M. Hogan; Carl L. Silverman; Derek P. Lawrence

[57] ABSTRACT

A method and apparatus for suppressing internally generated gas turbine engine low frequency noise is disclosed. The apparatus is comprised of means for structuring the cross-sectional area of the gas flow path into one or more open elements of a predetermined size. The method involves a way of determining the size of each of the elements and the total number of elements.

6 Claims, 5 Drawing Figures

APPARATUS FOR SUPPRESSING INTERNALLY GENERATED GAS TURBINE ENGINE LOW FREQUENCY NOISE

BACKGROUND OF THE INVENTION

The invention herein described was made in the course of, or under, a contract (or grant) with the Department of Transportation.

1. Field of the Invention

This invention relates to noise suppression and, more specifically, to apparatus for suppressing internally generated gas turbine engine low frequency noise.

2. Description of the Prior Art

In the present era of environment awareness, it is becoming increasingly more important to reduce gas turbine engine pollutants with a minimum sacrifice in engine performance. One type of gas turbine engine pollution which has recently received considerable attention is noise pollution.

Gas turbine engine noise is generated from a variety of sources throughout the engine including jet noise, fan noise and internally generated or core noise. Until recently, the bulk of the noise reduction effort was concentrated on jet and fan noise suppression since they were the dominant noise sources in modern turbofan engines. With the advent of the quiet fan installations associated with modern turbofan engines such as the CF6 family, jet and fan noise are no longer considered the dominant noise sources and more attention is now being focused upon the reduction of internally generated low frequency noise.

Internally generated low frequency noise is broadly defined to include a variety of noise sources such as core engine or combustor noise, turbine noise, swirl noise (impacting upon struts), tailpipe noise or noise from the high pressure gas flow scrubbing up on the nozzle walls. The use of traditional prior art acoustical absorption materials to suppress internally generated low frequency noise has proved ineffective due to the severity of the environmental conditions and the limited available space. In addition, the substantial cost and bulk, inherent in the use of such prior art approaches has negated their wide-spread adoption.

SUMMARY OF THE INVENTION

It is, therefore, an object of the present invention to provide an apparatus for effectively suppressing internally generated gas turbine engine low frequency noise without substantially affecting engine efficiency.

It is another object of the present invention to provide such an apparatus which is relatively inexpensive to construct and operate.

Briefly stated, these objects, as well as additional objects and advantages, which will become apparent from the following specification and the appended drawings and claims, are accomplished by the present invention which, in one form, comprises apparatus for suppressing internally generated gas turbine engine low frequency noise. The apparatus is comprised of means for structuring the cross-sectional area of the gas flow path into one or more open elements. Each of the elements has a characteristic dimension less than or equal to a suppressor constant times the acoustic wavelength of an internally generated noise frequency which is to be suppressed, and the number of elements being such that the total cross-sectional flow area of the gas flow path is substantially unchanged.

DESCRIPTION OF THE PREFERRED EMBODIMENT

Figure 1:
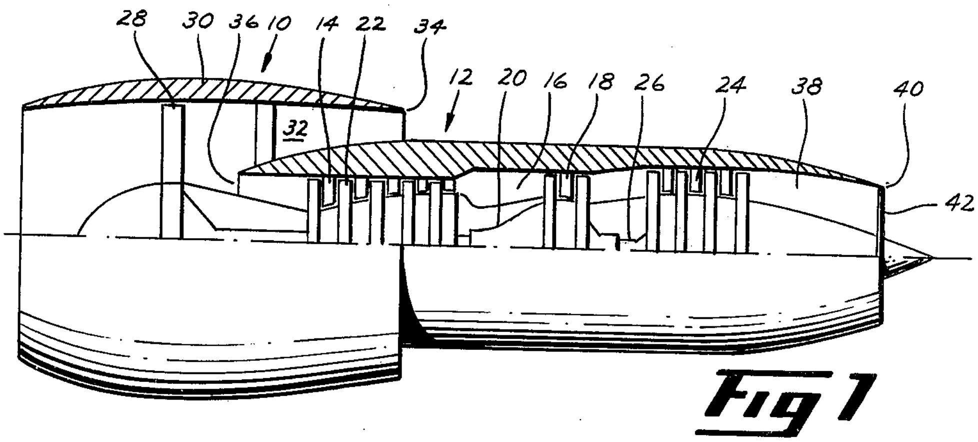
FIG. 1 is a schematical cross section of a typical gas turbine engine which includes the suppressor of the present invention.

Referring to the drawings, wherein like numerals correspond to like elements throughout, attention is first directed to FIG. 1 wherein a typical gas turbine engine, shown generally as 10, is depicted as embodying in one form, the present invention. The engine 10 is comprised of a core engine or core 12 which includes in serial flow relationship, an axial flow compressor 14, a combustor 16 and a high pressure turbine 18. The high pressure turbine 18 is drivingly connected to the compressor 14 by a shaft 20 and a core rotor 22. The engine 10 is also comprised of a low pressure system, which includes a low pressure turbine 24 which is drivingly connected by a low pressure shaft 26 to a fan assembly 28. An outer nacelle 30 is spaced apart from the core engine 12 to define a bypass duct 32 therebetween.

In operation, air enters the engine 10 and is initially compressed by the fan assembly 28. A first portion of this compressed fan air enters the bypass duct 32 and is subsequently discharged through a fan bypass nozzle 34 to provide a first propulsive force. The rest of the compressed fan air enters an inlet 36, is further compressed by the compressor 14 and is discharged into the combustor 16 where it is burned with fuel to provide high energy combustion gases. The combustion gases pass through and drive the high pressure turbine 18 which, in turn, drives the compressor 14. The combustion gases subsequently pass through and drive the low pressure turbine 24 which, in turn, drives the fan 28. The combustion gases then pass along an exhaust flow path 38 whereupon they are discharged from a core exhaust nozzle 40 thereby providing a second propulsive force.

The foregoing description is typical of a present-day turbofan engine; however, as will become apparent from the following description, the method and apparatus of the present invention is equally applicable in conjunction with any other type of gas turbine engine, for example a turboprop, turbojet, turboshaft, etc. The above description of the turbofan engine depicted in FIG. 1 is, therefore, merely meant to be illustrative of one such application of the present invention.

Figure 2:
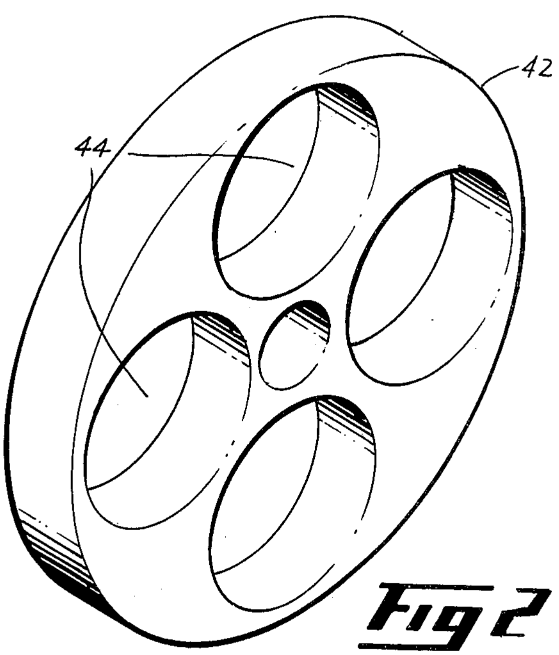
FIG. 2 is a prospective view of the preferred embodiment of the suppressor of the present invention.

Referring now to FIGS. 1 and 2, there is depicted one embodiment of the present invention in the form of a core exhaust nozzle suppressor 42. The use of the suppressor as a core exhaust nozzle is only for purposes of illustration and is not intended to be limiting. The suppressor 42 could be positioned at any other location along the exhaust flow path 38 which is downstream of the low pressure turbine 24. In addition, apparatus of the present invention could be applied for the suppression of low frequency noise generated in the area of the fan assembly 28 by placing a suitably designed suppressor within the bypass duct 32.

Figure 3:
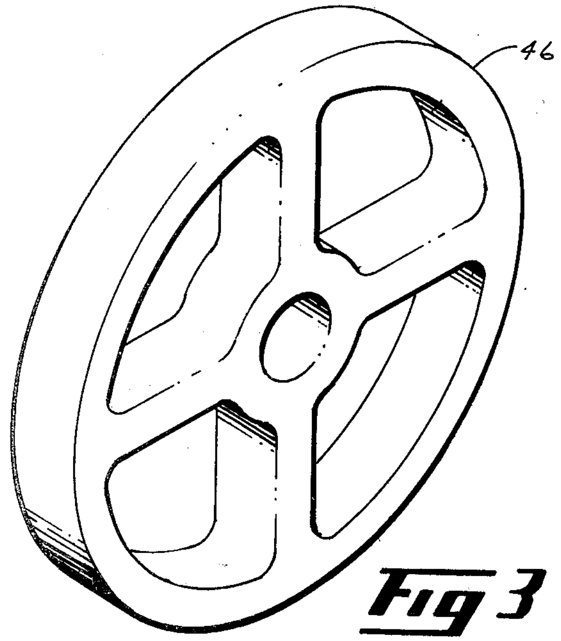
FIG. 3 is a prospective view of another configuration of the suppressor of the present invention.

In the embodiment shown in FIGS. 1 and 2, the suppressor 42 is a one-piece, generally disc-shaped member. By "disc-shaped", it is meant that the suppressor 42 has a generally round configuration, parallel and flat forward and aft faces, and an axial length of relatively short dimension in comparison with the diameter of the suppressor. Such a one-piece, disc-shaped member results in a suppressor which is inexpensive and simple to construct and install. As can best be seen in FIG. 1, the suppressor 42 is located at the downstream end of the core exhaust nozzle 40, and preferably, the aft face of the suppressor 42 is coplanar with the plane defined by the aft edge of the core exhaust nozzle 40. As shown in FIGS. 1, 2 and 3, the suppressor can include an opening in a generally center portion thereof through which a diffuser cone or plug protrudes, when the engine is so equipped. Such an opening would, of course, conform to the shape of the diffuser cone or plug, and therefore, the circular shaped opening shown is only one example of an appropriate shape for the opening.

The suppressor 42 is comprised of four open segments or elements 44 through which the combustion gases are discharged. Preferably, the open elements 44 are arranged symmetrically about and equidistantly from the center of the suppressor 42. As will hereinafter become apparent, the cross-sectional area of each element 44 is particularly important to the operation of the suppressor 42 and the total cross-sectional flow area of all of the elements is likewise important to the efficient operation of the engine. It was discovered that if the cross-sectional area of each of the elements as measured by a characteristic dimension, or "a", is significantly smaller than the acoustic wavelength of the internally generated low frequency noise then the nozzle 40 becomes a very ineffective radiator of the noise and an effective block to the further passage of such noise. Thus, most of the low frequency internally generated noise is reflected forward along the exhaust flow path 38 rather than being radiated out of the engine.

When the open elements being employed are generally circular, as depicted in FIG. 2, the characteristic dimension of each element is measured by its radius. When the elements being employed are not generally circular, as for example, in the alternate embodiment suppressor 46 depicted in FIG. 3, the characteristic dimension of each element is the hydraulic diameter of the element. (As is generally known to those skilled in the art and as is used herein the hydraulic diameter of a noncircular shape is equal to two times the area of the shape divided by the perimeter of the shape.)

The following formula can be used as a generalized criterion for designing a low frequency noise suppressor $$a \leqq K\lambda \tag{1}$$

where:

- a is the characteristic dimension of the suppressor element or elements;
- K is a suppressor constant which is dependent on the desired level of suppression; and
- $\lambda$ is the acoustic wavelength of the frequency desired to be suppressed at the engine operating condition of concern.

The number of open elements which are employed in each suppressor is dependent upon the cross-sectional area of the exhaust flow path: the larger the flow path cross-sectional area, the more elements (having the characteristic dimension) must be employed. Thus, the location of the suppressor must also be taken into account since the cross-sectional area of the exhaust flow path 38 may vary from the low pressure turbine 24 to the core exhaust nozzle 40. Ideally, the total exhaust area through the suppressor (number of elements X area of each element) should be substantially the same as the cross-sectional flow area of the unsuppressed exhaust flow path to minimize exhaust flow losses in order to maintain overall engine operating efficiency.

By substantially the same cross-sectional flow areas it is meant that although the cross-sectional flow areas of a suppressed nozzle and of an unsuppressed nozzle are not identical since some blockage of the flow path is inevitable when the suppressor 42 is employed, the difference between the two areas should be preferably minimized. This can be accomplished by minimizing the area of the solid cross-sectional portion of the suppressor 42 to the greatest extent practicable while maintaining the structural rigidity of the suppressor.

Although multielement nozzles have traditionally been employed for jet noise suppression, the concept of internally generated low frequency noise suppression is entirely different. The design criterion for the externally generated jet noise suppression is to segment and segregate the exiting exhaust flow into a large number of smaller jets in order to enhance mixing of the exhaust jet with ambient air. In addition, jet noise suppression is enhanced by increasing the overall perimeter of the exhaust jet. The number of elements, type of element employed and overall area ratio of the jet noise suppressor vary depending only upon the exhaust flow velocity.

The suppression of the present invention operates by reducing the characteristic dimension of the exhaust flow area so that it is significantly smaller than the acoustic wavelength of the internally generated low frequency noise. Most of the low frequency noise is, therefore, reflected forward along the exhaust flow path rather than being radiated out of the engine. Thus, the design criteria for the suppressor of the present invention is dependent primarily upon the acoustical wavelength of the noise and does not vary significantly with the exhaust flow velocity. For example, a segmented nozzle made in accordance with the method of the present invention which is being utilized on an engine having an exhaust velocity of 1100 feet per second may actually cause a slight increase in jet noise over an unsuppressed engine, but will cause a significant reduction in the level of internally generated low frequency noise.

Figure 4:
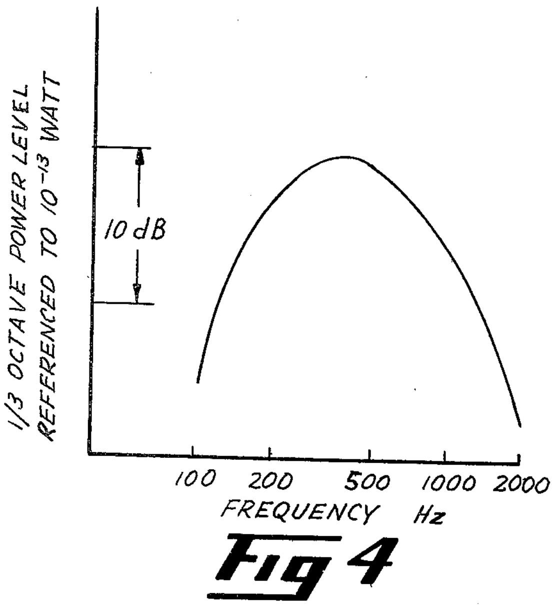
FIG. 4 is a graphical representation of a typical core noise signature for a gas turbine engine of the type depicted in FIG. 1.

In making the suppressor 42 (or 46) it is necessary to measure the spectrum of the frequencies of the noise which is desired to be suppressed. As can be seen from the typical core noise spectrum of FIG. 4, measurement has shown that there is a peak in the internally generated low frequency noise curve at about 400 Hz. Accordingly, in the preferred embodiment of the present invention, 400 Hz was selected as the desired frequency to be suppressed. It is to be understood that the present invention is not limited to the 400 Hz selected, but is equally applicable to other frequencies. It should also be noted that the inherent nature of the suppressor 42 also results in the suppression of a band of frequencies extending both above and below the actual frequency selected.

Once the desired suppression frequency has been selected, the acoustic wavelength under the particular operating conditions must be determined. In this embodiment, the operating condition of principal concern is landing approach power. Engineering design and operational measurements have indicated that when the engine 10 is operating at the approach power level, the core exhaust temperature is approximately 411° C. (1200° R.). Using standard tables well known to those skilled in the art it is easy to determine that the speed of sound in air at 411° C. is 1666 feet per second. From this figure, the acoustic wavelength of the 400 Hz noise at the core exhaust nozzle may be calculated as follows:

$$1666 \text{ feet/sec}/400 \text{ Hz} = 4.165 \text{ feet/cycle}$$

Although this acoustic wavelength was utilized as a criteria for the design of the suppressor of the preferred embodiment, the present invention is not limited to suppressors operating at this acoustic wavelength since both the desired suppression frequency and the engine operating condition of concern may vary.

In making the suppressor 42 it is also necessary to select the level of suppression which is desired. In this embodiment it was determined that a level of suppression of about 4.6 dB would provide a farfield noise signature reduction which would be adequate for most applications. Although 4.6 dB was selected for this embodiment it should be recognized that the present invention is equally applicable to other levels of suppression.

Figure 5:
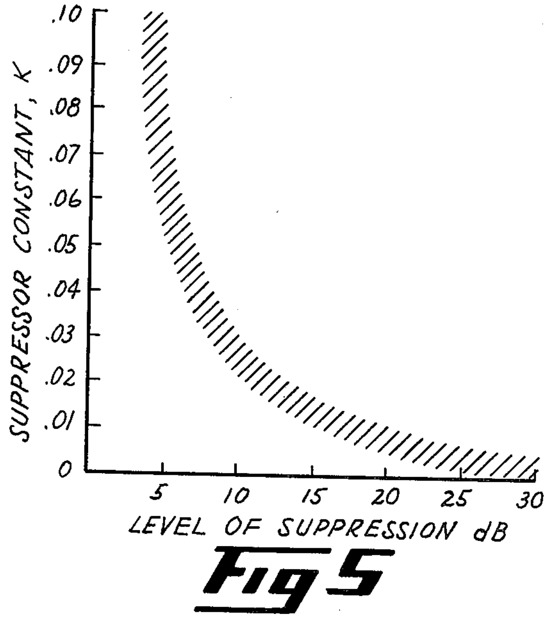
FIG. 5 is a graphical representation of a derived mathematical relationship between a level of core noise suppression and a suppressor constant.

Referring to FIG. 5, there is depicted a graphical representation of the approximate relationship between the level of suppression and the suppressor constant K. This graphical representation is the result of parametrically exercising equations describing the radiation of sound from a pipe to the farfield. These equations, which are well known to those skilled in the art can be found, for example, in "*Fundamentals of Acoustics*" by Kinsler and Frey (1962), Chapters 7 and 8. Utilizing FIG. 5, it can be seen that the suppressor constant corresponding to the selected level of suppression of 4.6 dB is approximately 0.08.

Substituting the calculated acoustic wavelength (λ) of 4.165 feet/cycle and the suppressor constant (K) of 0.08 into equation (1) above yields the following:

$$a \leqq 0.08 \times 4.165$$

$$a \leqq 3.984 \text{ inches}$$

Thus, a suppressor 42 with four circular elements as depicted in FIG. 2 each element with a characteristic dimension (radius) of approximately 4 inches (or less) provides approximately a 4.6 dB reduction in the farfield noise signature for internally generated low frequency noise associated with the engine 10. A similar noise reduction would be achieved if a suppressor 46 having the four arbitrarily shaped elements depicted in FIG. 3 was employed with each element's characteristic dimension being approximately 4 inches (or less).

From the foregoing description, it can be seen that the present invention provides apparatus for the effective suppression of internally generated gas turbine engine low frequency noise without substantially affecting engine efficiency. It will be recognized by one skilled in the art that changes may be made to the above-described invention without departing from the broad inventive concepts thereof. For example, the present invention could be employed to suppress low frequency noise in the fan stream of a gas turbine engine. It is to be understood, therefore, that this invention is not limited to the particular embodiment disclosed but it is intended to cover all modifications which are within the spirit and scope of the invention as set forth in the appended claims.

What is claimed is:

1. In a gas turbine engine including a gas flow path and a core exhaust nozzle, an apparatus for suppressing internally generated low frequency noise comprising:

a one-piece, generally disc-shaped suppressor located within and at the downstream end of the core exhaust nozzle of the engine, said suppressor comprising a plurality of open elements therethrough, a characteristic dimension of each of said open elements being less than or equal to a suppressor constant times the acoustic wavelength of an internally generated noise frequency which is to be suppressed.

2. The apparatus of claim 1, wherein said nozzle has an aft edge and said suppressor has an eft face coplanar with a plane defined by said aft edge of said nozzle.

3. The apparatus of claim 1, wherein said open elements are generally circular.

4. The apparatus of claim 1, wherein said suppressor comprises four open elements, therethrough.

5. The apparatus of claim 1, further comprising an opening in a generally center portion of said suppressor.

6. The apparatus of claim 1, wherein said suppressor has a center and said open elements are arranged symmetrically about and equidistantly from said center of said suppressor.

* * * * *